United States Patent
Thrasher

[15] 3,645,304
[45] Feb. 29, 1972

[54] METHOD AND APPARATUS FOR OPERATING A ROTARY SAW

[72] Inventor: Elbridge W. Thrasher, Ukiah, Calif.
[73] Assignee: Masonite Corporation
[22] Filed: Nov. 2, 1970
[21] Appl. No.: 85,969

Related U.S. Application Data

[62] Continuation-in-part of Ser. No. 791,930, Jan. 17, 1969, Pat. No. 3,568,738.

[52] U.S. Cl. ..................143/160, 143/37 R, 143/157 F, 143/157 G, 143/165, 144/312
[51] Int. Cl. .......................................................B27b 5/34
[58] Field of Search..............143/160, 160.8, 165, 166, 37, 143/157.6, 157.7, 56; 144/312

[56] References Cited

UNITED STATES PATENTS

| | | | |
|---|---|---|---|
| 800,426 | 9/1905 | Calkins | 143/56 |
| 78,752 | 6/1868 | Milner | 143/160 R |
| 3,285,302 | 11/1966 | Thrasher | 143/37 R |
| 15,304 | 7/1856 | Rice | 143/160 R |
| 2,709,464 | 5/1955 | Kreidler | 143/160 R |
| 3,580,305 | 5/1971 | Wright | 143/37 |

FOREIGN PATENTS OR APPLICATIONS

| | | | |
|---|---|---|---|
| 45,894 | 0/1918 | Sweden | 143/160 |

*Primary Examiner*—Donald R. Schran
*Assistant Examiner*—James F. Coan
*Attorney*—Eckhoff and Hoppe

[57] ABSTRACT

Method and apparatus for operating a rotary saw with saw guides that apply lateral surface pressure to guided saw blades mounted on a saw arbor and more particularly wherein each of a plurality of saw guides is positioned in spaced relation as to engage the sides of a saw blade with little or no pressure until after the saws have developed substantial inertia and speed of rotation, the saw guides then being moved into pressure engagement with the saw blades while simultaneously positioned to establish predetermined guide planes for each of the saw blades.

A saw guide for rotary saw machines having at least one rotary saw blade keyed to a saw arbor and axially movable thereon, the saw guide comprising a pair of substantially parallel support arms having contact surfaces for engaging opposite sides of a rotary saw blade, means for securing the support arms together in back of the trailing edge of the saw blade, and means for selectively positioning the support arms in predetermined spaced relation in front of the leading edge of the saw blade to establish a pressure contact with the guided saw blade or allow the support arms to move apart and release the pressure on the saw blade.

3 Claims, 11 Drawing Figures

INVENTOR.
ELBRIDGE W. THRASHER

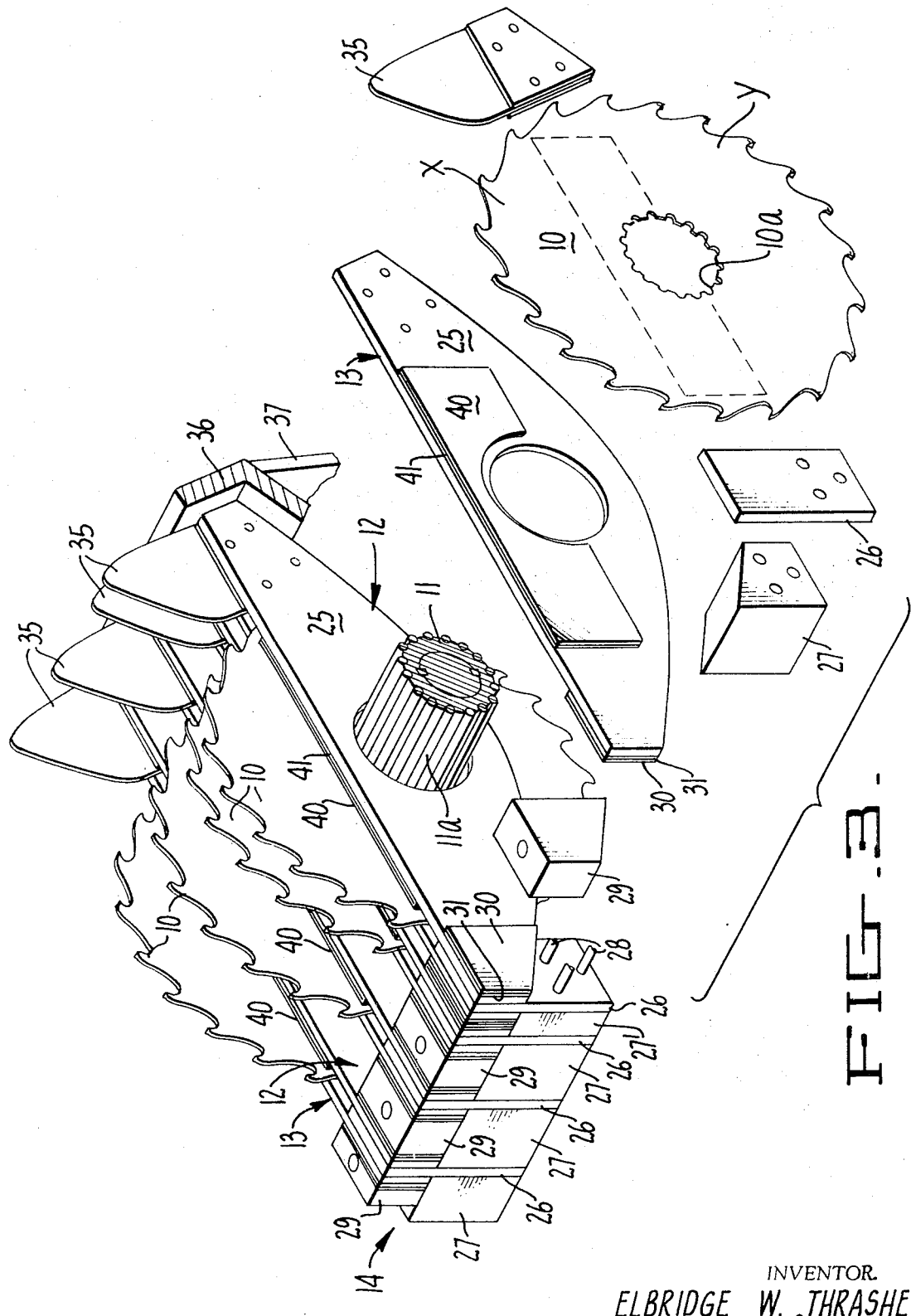

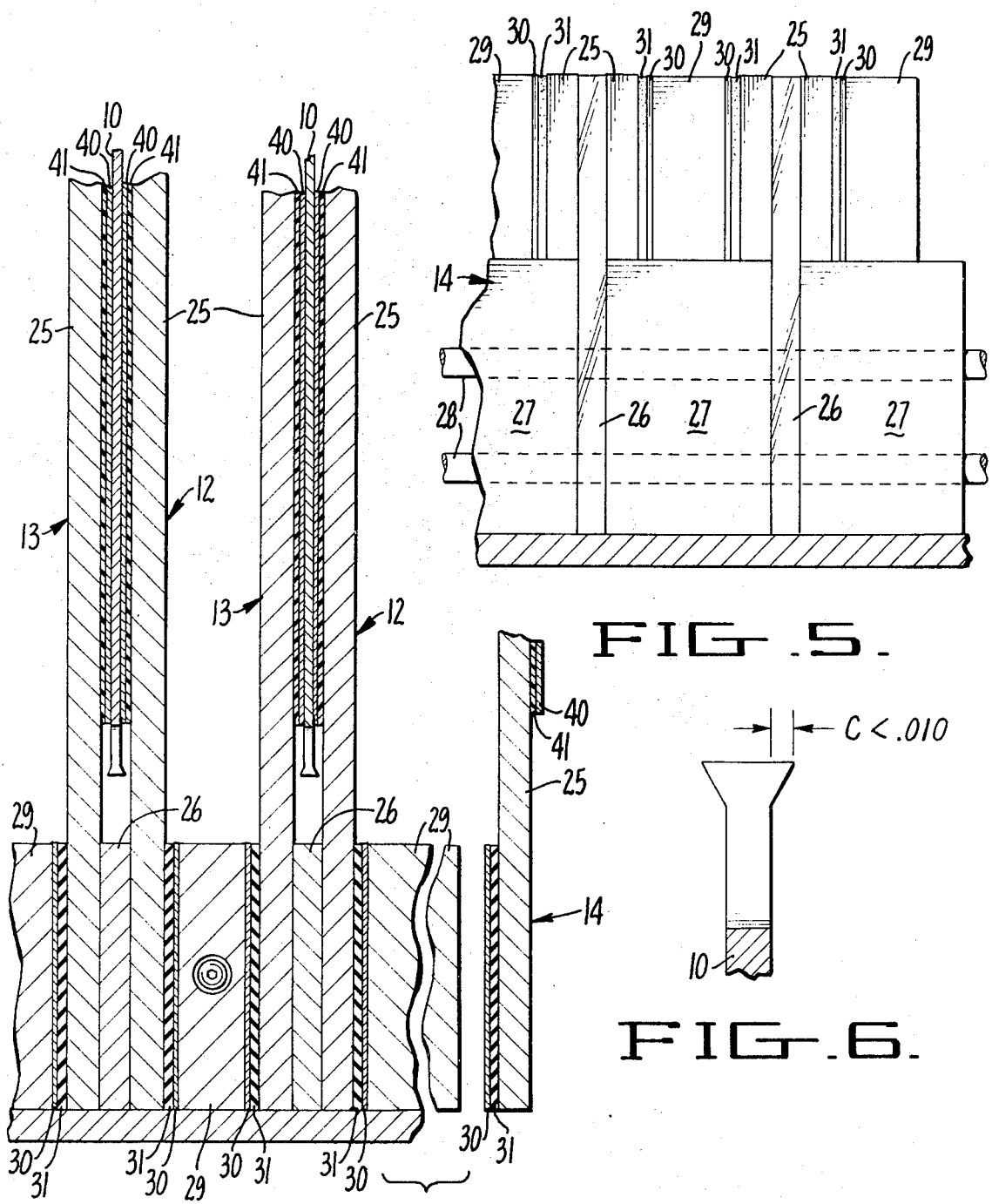

INVENTOR.
ELBRIDGE W. THRASHER
BY
ATTORNEYS

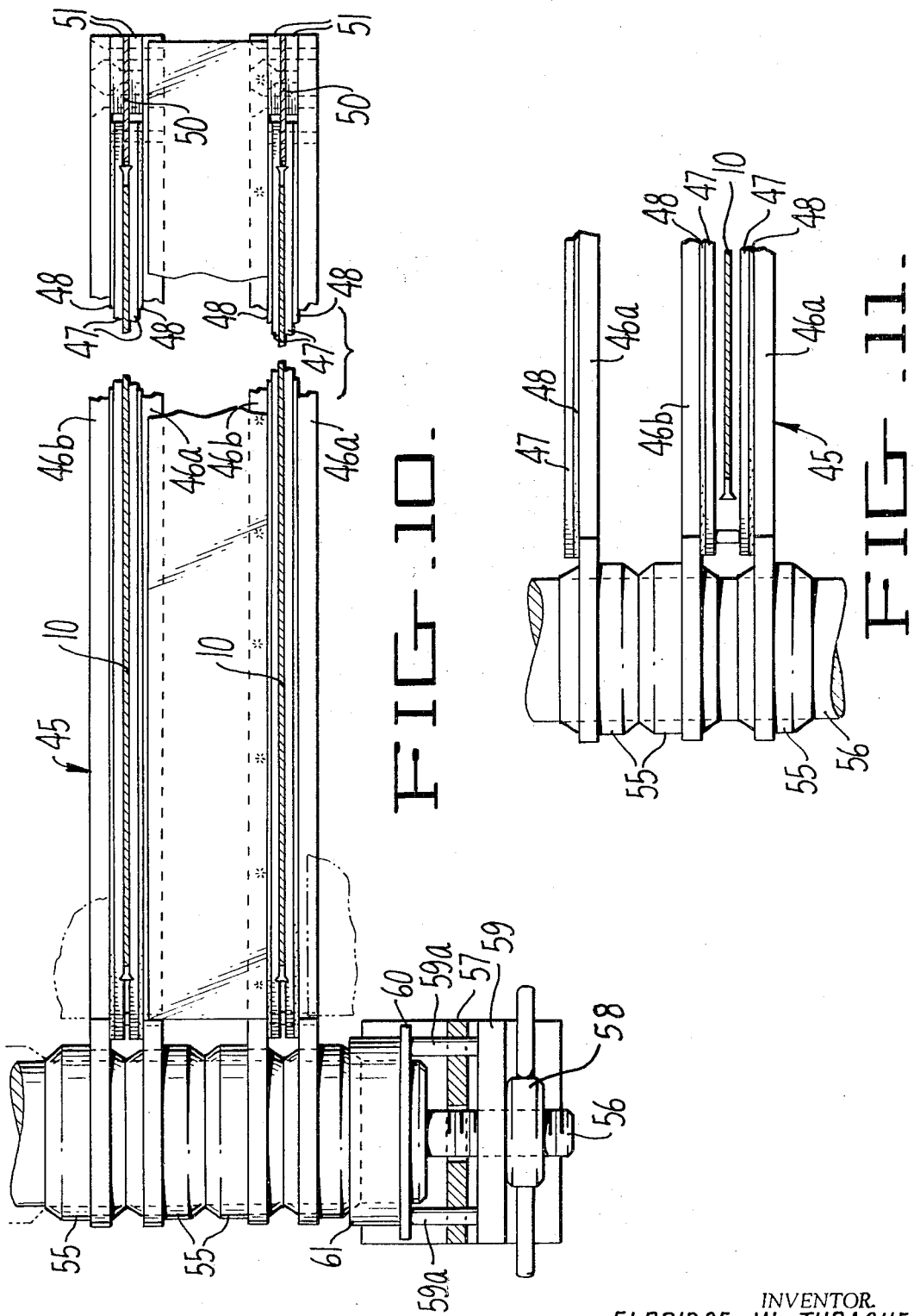

METHOD AND APPARATUS FOR OPERATING A ROTARY SAW

This application is a division and continuation-in-part application of U.S. application Ser. No. 791,930, filed Jan. 17, 1969 and now U.S. Pat. No. 3,568,738.

This invention relates generally to rotary saw equipment and to a method for operating a rotary saw with saw guides that apply lateral surface pressure to saw blades which may be moved axially on a saw arbor. The invention more particularly involves the construction, mounting and use of saw guides, especially with relatively thin circular saws, to increase the recovery of lumber from logs.

The use of saw guides for maintaining relatively thin saws in predetermined cutting planes is described in U.S. Pat. No. 3,285,302. It is also to be understood that the use of splitters in back of a circular saw is not novel. The present invention, however, is an improvement over these prior art devices in several important respects. First, the construction and mounting of saw guides as herein described rigidifies the saw blade while effectively maintaining the blade in a predetermined cutting plane. This enhances the overall operation and performance of the saw guides to enable even thinner saw kerfs to be used than previously possible.

A further advancement of the art resides in providing a method and apparatus for operating a rotary saw with a plurality of saw blades and saw guides which apply lateral surface pressure to guide and rigidify the saw blades while the rotary saw is in operation. With machine of this kind, it is difficult is not impossible to bring the saw blades up to the necessary rotational speeds using only conventional constructions and methods of operation.

It is to be understood that the present invention is applicable to both single and double arbor saw machines. It may also be used in connection with saws mounted on either top or bottom arbors. However, the invention is of particular significance and importance in the operation of thin saws especially when used to produce exceptionally smooth surfaces as described and claimed in parent application Ser. No. 791,930, filed Jan. 17, 1969.

It is, therefore, a principal object of this invention to provide methods and apparatus for operating a rotary saw having a plurality of thin saw blades to increase lumber recovery.

Another object is to provide apparatus which will reduce the time and expense of machine maintenance and enhance both general operation and machine performance.

Another object of the invention is to provide improved forms of apparatus that may be used in commercial operations to produce lumber at a high production rate.

It is another object to provide saw guides for rotary saw machines of the kind described, said saw guides having an improved construction for yieldably supporting contact member that rigidify the saw blades while maintaining the blades in predetermined cutting planes.

A still further object of the invention is to provide a method and apparatus for operating a rotary saw with saw guides that apply lateral surface pressure to guided saw blades wherein the saw guides may be moved into pressure contact with the saw blades while the saws are being rotated and then maintained in positions that define predetermined guide planes.

Other objects of this invention will become apparent in view of the following detailed description.

In the drawings forming a part of this application and in which like parts are identified by like reference numerals throughout the same, FIG. 1 is a side elevation and partial section of a single arbor, battery edger constructed and operated in a preferred manner contemplated by this invention;

FIG. 3 is a perspective view of a portion of the battery edger showing the relationship of saw blades, saw guides and splitters;

FIG. 4 is an enlarged section taken on lines 4—4 of FIG. 2;

FIG. 5 is an enlarged elevation and section taken on lines 5—5 of FIG. 2;

FIG. 6 is an enlarged detail of a single tooth of one of the rotary saw blades:

FIG. 10 is a top plan view of a pair of saw guides as viewed on lines 10—10 of FIG. 7; and FIG. 11 is an enlarged view of the saw guide mounting shown in FIG. 10 but illustrating the positions of saw guide support arms which have been moved apart to relieve the contact pressure normally applied to the guided saw blade.

Figure 1:
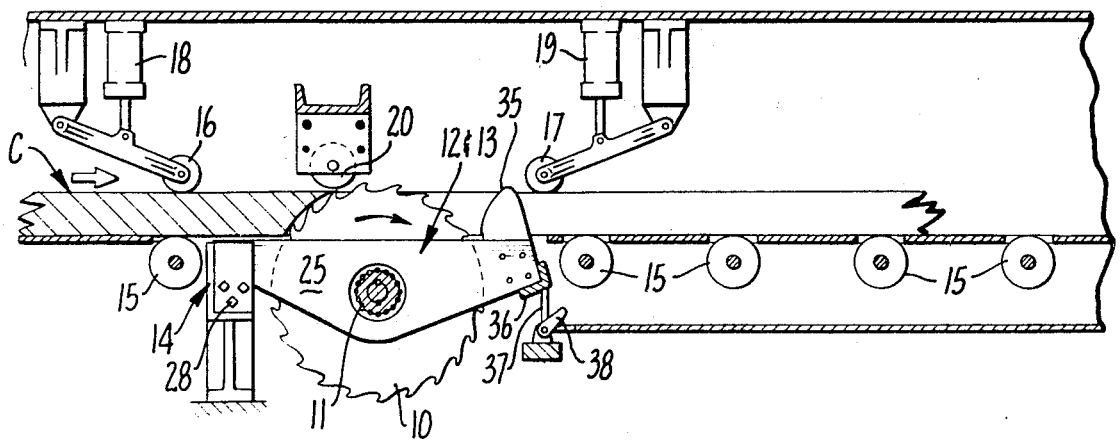

Referring to FIG. 1, there is shown one embodiment in a rotary saw machine for practicing this invention, said machine comprising a battery of rotary saws 10 each keyed for rotation with a splined shaft or arbor 11 that is driven clockwise, as shown. Each saw is mounted with a floating axial looseness, as described in U.S. Pat. No. 3,285,302, and is guided in a predetermined cutting plane by a pair of spaced saw guides 12 and 13 supported from a mounting block 14 disposed adjacent the front edge of saws 10. The construction of these saw guides is described hereinafter in greater detail.

It will be noted that saws 10 are not mounted upon arbor 11 with saw collars as in the conventional manner. Instead, saws 10 are formed with a center opening having a scalloped edge 10a that is defined by a plurality of equal spaced circular arcs, each are receiving one of the circular splines that is provided on splined surface 11a of arbor 11. This saw mounting arrangement has been found particularly useful since it permits the use of saw guides in areas closely adjacent to the saw arbor while facilitating the axial movement of blades along the arbor. In addition, and by reason of the self-centering action which is produced when arbor 11 is rotated, essentially all clearances between splined surface 11a and scalloped edge 10a are eliminated. This reduces blade vibrations which are normally created by a sloppiness in fit or clearances as between the shaft and opening of standard saw collars. The reduction or elimination of vibrations is an important factor in making cuts of maximum smoothness.

The workpiece or cant C is fed into rotary saws 10 in the same direction as the direction of cutting. Simultaneously, cant C is held against a plurality of feed and transport rollers 15 by means of press rolls 16 and 17, respectively disposed on front and backsides of the saws. Press roll 16 is adapted to be moved and held against the cant by a cylinder 18 and press roll 17 is similarly positioned and held down by a cylinder 19. A preferred form of apparatus contemplated by this invention also includes a fixed roller 20 disposed directly in front of saws 10, the lower surface of said roller being at a level only slightly below the maximum cutting height of the saws. This roller assures that each cant passing through the battery of saws will be cut and that no piece is able to pass into and then over the top of the saws.

It is to be understood that a lubricating fluid is introduced into the work area of saw blades 10 in any conventional manner. For example, lubricating fluid (normally water) may be introduced through the saw guides or, as more conventionally constructed, the machines may be equipped with a dispensing tube having a plurality of jets through which water is sprayed into the working area.

Saw guides 12 and 13 comprises a resilient support arm 25, the front end of each arm being rigidly clamped in mounting block 14, which essentially comprises a plurality of centering plates 26 and spacer blocks 27, 27' held together in a block assembly by a plurality of through bolt connectors 28. Referring to FIGS. 2 through 5, it will be seen that the support arms of each pair of saw guides 12 and 13 are clamped against opposite sides of one-centering plate 26, each centering plate defining a reference plane for maintaining one of the saws in a predetermined cutting plane. Support arms 25 are held against centering plates 26 (and in spaced relation to other support arms) by spacer blocks 29, facing plates 30 and layers of hard rubber 31. One facing plate 30 is bonded to one of the hard rubber layers 31 which in turn is bonded to the side facing of the support arm 25, forming a one-piece assembly. Layers 31 function as a vibrational dampening means but also provide "-give," allowing each support arm to be interdigitated with spacer blocks and centering plates by wedging them therebetween. Each facing plate 30 allows the support arm to be mounted in block 14 between other support arms without abrading the resilient material which would otherwise be exposed.

Each complementary pair of support arms 25 are interconnected in back of saws 10, a splitter 35 being clamped therebetween. In addition, the rear ends of support arms 25 normally rest upon an angle bar 36 which may be moved rearwardly to a nonsupporting position. More particularly, bar 36 is pivotally supported upon a pair of radial arms 37, each arm being secured to a shaft that may be rotated by operating a crank arm 38. Thus, a slight clockwise rotation of crank arm 38 will move angle bar 36 to a nonsupporting position in back of support arm 25. This allows each support arm to be pivoted about the saw arbor axis into the broken line position illustrated in FIG. 2, a position from which the saws and saw guides may be removed axially from arbor 11.

It is to be understood that the flexibility of each support arm 25, which may be made of aluminum, allows the saw guides to move laterally in a direction substantially parallel with the axis of arbor 11. The resiliency of each support arm, however, causes the arm as well as the guided saw blade 10 to return to its neutral position.

Each saw guide further comprises a wear plate 40 mounted to a support arm 25 and having a wear surface that is maintained in contact with the side surface of a saw blade under a resilient preload force. This force is provided by a layer of resilient material 41 sandwiched between the support arm and its supported wear plate. In a preferred construction, the wear plate may be made of micarta and the resilient layer of polyurethane foam which is maintained in compression by the spacing of the support arms and their own resiliency.

Figure 2:
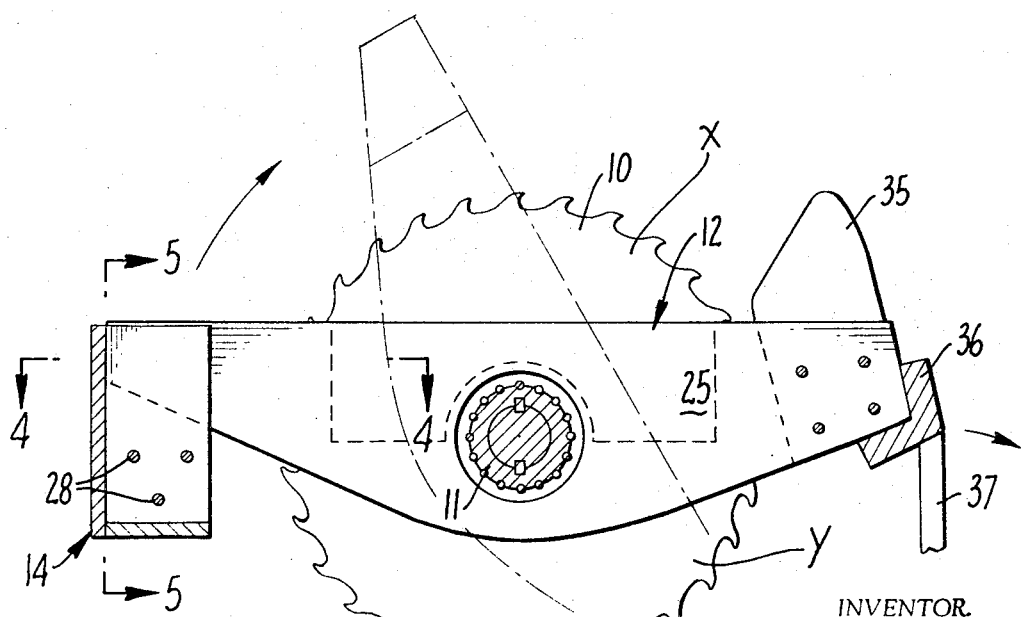
FIG. 2 is an enlarged view of a portion of the battery edger shown in FIG. 1.

Referring to FIGS. 2 and 3 in particular, it will be evident that wear plates 40 provide an area of continuous contact extending from points near the gullet on the leading edge of the saw blades across the blade to points adjacent the back edge thereof and that the area of contact on each side of the saw blade is generally opposite to the area of contact made on the other side. Further, the areas of continuous contact extend between the working area of each saw and the saw arbor and form two separated and unsupported blade areas of different size, these areas being indicated generally by the reference letters X and Y. The smaller of the two areas it will be seen is the working area of the blade, the larger area being provided below wear plates 40 to allow for blade warpage when the blade is stretched during use.

In operation, the preload force of each saw guide 12 counteracts the preload force of the saw guide 13 forming its pair. These forces rigidify the saw blade in the contacted areas while also maintaining each saw blade in a predetermined cutting plane. The flexibility of layer 41 and the resiliency of support arms 25, however, provide sufficient give to tolerate minor deflections in the saw blade as might to be caused by slivers of wood or knots. Any lateral distortions or deflections of the saw will increase the forces which tend to return the saw into its intended cutting plane. It is also important to note that since each pair of saw guides 12 and 13 are connected together in back of the saws they move as a unit, The resiliency of both support arms acting to the return the saw blade confined therebetween to its neutral position while maintaining pressure on both sides of the saw.

The method and apparatus described above has been found particularly effective for guiding relatively thin saws having a saw kerf of only 0.100 inch. The invention, moreover, allows and fully contemplates the use of saw blades having saw kerfs substantially less than 0.100 inch—even when cutting wood material of a nominal 4-inch thickness and greater on a high-production basis. But, it is also contemplated that saw kerfs and blades of greater thickness may be used to produce a rotary smoothness in accordance with the methods herein described.

It has been found that the method of sawing herein described may be effectively practiced in cutting wood having a nominal thickness 4 inches and greater even though the side clearance of each saw tooth is less than 0.010 inch per side, this being indicated in FIG. 6. This is to be compared with a side clearance of 0.015 as used in the best known procedures of the prior art, which also operate with thin saw blades. Although the difference in side clearance (amounting to 0.010 inch across the full width of each tooth) may not appear substantial, even this difference may be a major factor in the recovery level for commercial mill operations. But the importance of the invention is further highlighted since it is possible to use side clearances well below 0.010 inch per side. In actual practice, it has been found that thin saws may be operated with a side clearance less than 0.005 inch per side.

The use of saw blades having comparatively small kerfs and side clearances are particularly favored since it has been found that they produce a smoother cut. It is believed that this is at least partly attributable to the smaller size chip that is cut from the workpiece. Larger kerfs produce larger chips and this, it would seem, increases the vibration on the teeth and/or produces a more abrupt cut in the workpiece. In any event, the methods and apparatus described herein may be more effectively utilized to produce smoother cuts by employing saw blades with a small kerf and reduced side clearances.

It is contemplated that saw blades used with this invention should be precision side-ground to maintain the side clearances suggested above. In this regard, the saw blades either may be formed with carbide teeth or the teeth be swaged in the normal manner and then ground to the specified clearance. In the latter event, it is desirable to harden the top of each tooth to maintain sharpness and decrease wear. One type of apparatus found to be particularly useful for hardening the saw teeth is that manufactured by Rocklin Manufacturing Company wherein tungsten carbide is deposited on each tooth in a process known as "spark hardening."

It is further contemplated that in a preferred machine embodiment for practicing this invention, each piece of lumber cut by saws 10 will be moved rearwardly upon rollers 15 until discharge onto a transverse conveyor, and that while being moved the lumber will be confined with in a continuous housing. It is only after the lumber pieces come to rest on the transverse conveyor, which may be disposed at an elevation below the surface of rollers 15, that the lumber will be brought into the open. The preferred embodiment might further include a bumper or stop positioned in back of the transverse conveyor in line with rollers 15 and spaced from the last roller 15 a distance that is at least as great the length of the longest workpiece which may be cut. This housing arrangement provides maximum safety conditions and insures that no piece of lumber may be inadvertently hurled from the roller conveyor by the cutting action of the saws into an area occupied by mill hands or operators.

Figure 7:
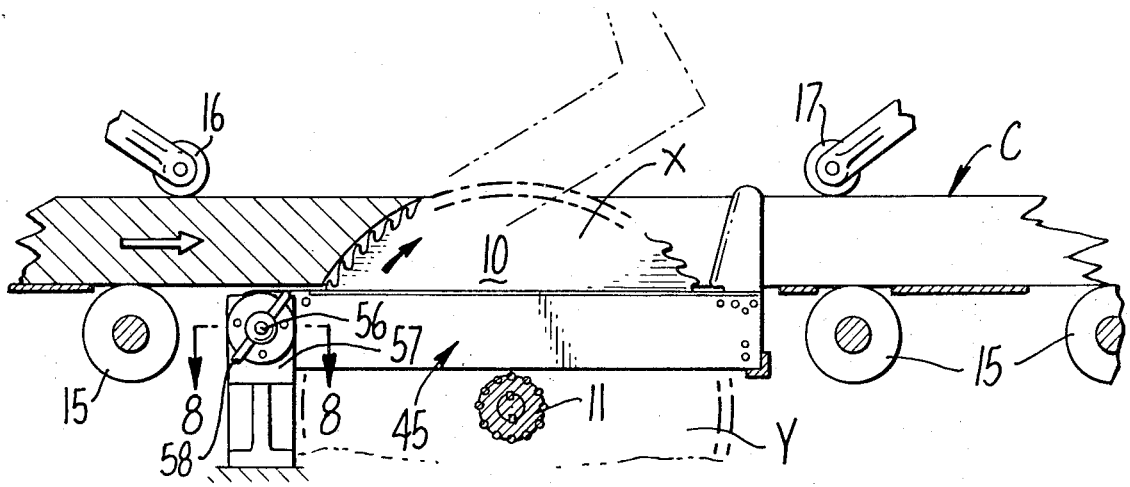
FIG. 7 is a side elevation and partial section of an edger similar to that shown in FIG. 1 but illustrating a later development in a preferred saw guide and mounting.
Figure 8:
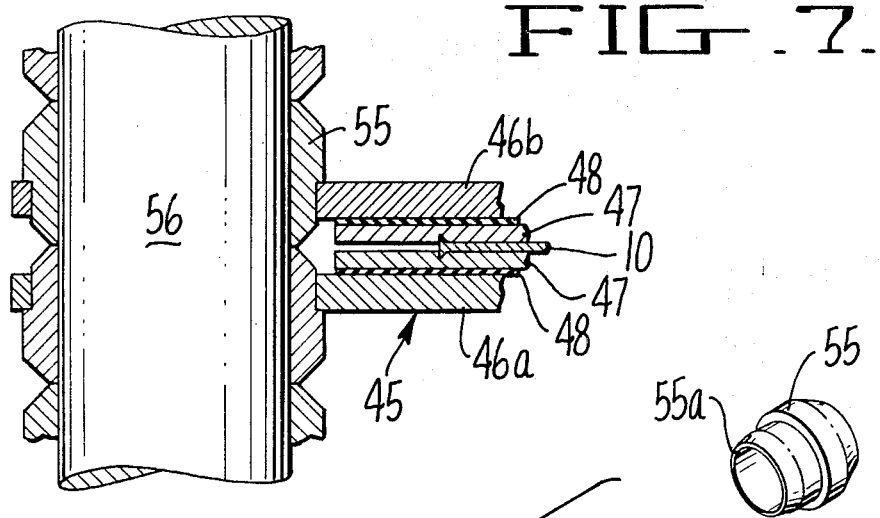
FIG. 8 is an enlarged section of a portion of the saw guide mounting taken on lines 8—8 of FIG. 7.
Figure 9:
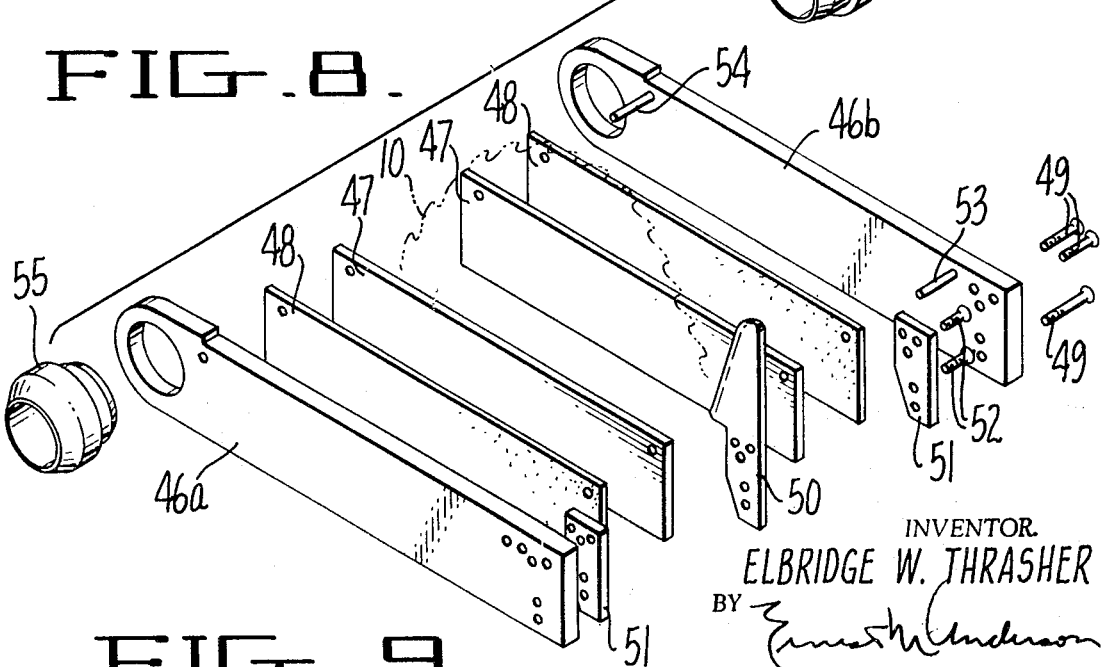
FIG. 9 is an exploded perspective view of one of the saw guides used in the machine of FIG. 7.

Referring to FIGS. 7 through 11, there is illustrated a second embodiment in an improved saw guide for rotary saws. FIG. 7 in particular illustrates the use of the saw guide in a machine environment that is essentially the same as that shown in FIG. 1, a pair of press rolls 16 and 17 holding a cant C onto support rolls 15 as the cant is moved through a plurality of saw blades 10.

Saw guides 45 comprise a pair of substantially parallel support arms 46a and 46b, each arm supporting a wear member 47 on top of a relatively thin layer of resilient material 48. Support arms 46a and 46b are secured together in predetermined spaced relation near the trailing edge of the guided saw blade by a plurality of screws 49, a splitter 50 and spacer blocks 51 separating the ends of the support arms. The combined width splitter 50 and spacer blocks 51 is selected by design so that the contact surfaces of wear members 47 are held in pressure engagement with the trailing edge surfaces of the guided saw blade, resilient layers 48 being compressed and exerting a force against the wear member.

As shown, saw guides 45 are constructed for assembly in two parts. One part comprises the support arm 46a, splitter 50 and the two spacer blocks 51, all of which are held together by a pair of screws 52. The other part comprises the support arm 46b, both wear members 47 and resilient layers 48. The wear members and resilient layers are assembled and supported from support arm 46b by means of screwlike guides 53 and 54, each having a threaded neck portion securing it to the support arm. The screwlike members also serve as a guide for aligning each pair of support arms in parallel relationship, the ends of the guides being received through openings provided in the complementary support arm 46a.

It is to be noted that the ends of support arms 46a and 46b (opposite to those which carry splitter 50 and spacer blocks 51) are not secured together in predetermined spaced relationship. Instead, each arm is mounted on the spacer sleeve 55 of predetermined axial length. Sleeves 55 are in turn supported for axial movement on a shaft 56 which extends transversely of the machine in parallel relationship to saw arbor 11. One end of shaft 56 is secured to the machine frame (not shown), the other end being threaded and received through an opening in a support plate 57. A large wingnut 58 engages the threaded portion of shaft 56, and a rotation of the wingnut which advances in the direction of support plate 57 imparts a corresponding and simultaneous axial movement to a collar 59, a ring 90 and a spacer sleeve 61. (Collar 59 carries a set of three pins 59a which project loosely through openings in support plate 57, the ends of pins 59a bearing against ring 60). This structure provides means for moving spacer sleeves 55 along shaft 56 to bring each sleeve into contact with adjacent sleeves while simultaneously setting up a predetermined spacing of the saw guides.

It will be understood that a rotation of wingnut 58 which moves the nut toward the end of shaft 56 produces spacing and allows the spacer sleeves each pair of support arms to separate under the resilient bias of layers 48. FIG. 11 of the drawings illustrates a typical example of the spacing which will be created by simply backing off the wingnut.

A mounting structure of the kind described in connection with saw guides 45 is an important attribute in the operation of a plurality of rotary saws. If no means is provided for relieving the pressure on the saw blades, there will be a particularly heavy drag which may damage the motor or make starting of the saws impossible. Therefore, it is to be understood that in a preferred method of operation, saw blades 10 are initially rotated while the saw guides engage the sides of the blades with little or nor pressure. Then, after the saw blades have developed substantially inertia and speed of rotation, the saw guides are moved into pressure engagement by forcing spacer sleeves 55 into abutting contact. The illustrated mounting structure is particularly adapted for carrying out this method since it simultaneously positions each saw guide in predetermined spaced relation to every other wear member and locates each saw blade in a predetermined guide plane.

It will be evident that saw guides 45 process all of the same attributes as the saw guide illustrated and described in connection with FIGS. 1 through 5. In this regard, wear members 47 are held against the side surfaces of saw blades 10 with a force that urges the saw blade against an opposing wear member to rigidify contacted portions of the blade and maintain the blade in a predetermined cutting plane. Wear members 47 also provide an area of substantially continuous contact extending from points near the gullet line on the leading edge of the saw blade across the blade to points adjacent the back edge of the blade. In addition, the area of contacts provided by saw guides 45 extend between two unsupported areas of different size, the smaller of the two arcs (X) being used as the working area of the blade while the larger area (Y) allows the room used as the working area of the blade while the larger are (Y) allows room for blade warpage.

Resilient layers 48 are also correspond to layers 41 of the first embodiment. During normal conditions of saw guiding operation each layer 48 is compressed and applies a preload force urging its wear member 47 against the saw blade. The layers may be compressed uniformly along the full length of the saw guide (as by providing equal spacing at both the leading and trailing edges of the saw blade) but a preferred construction of saw guide will provide less spacing at the leading edge where greatest rigidity and control of the saw blade is required.

The use of spacer sleeves 55 having tapered ends and relatively narrow contact ring surfaces 55a of is particular advantage in positioning the saw guides in predetermined spaced relation. Under normal operation conditions, it is to be expected that sawdust may accumulate in the area of the spacer sleeves, and this sawdust may become lodged between spacer sleeves when the sleeves are separated as they are during a blade change. The narrow contact ring 55a, which may be one thirty-second inch, prevents the collection of an appreciable amount of sawdust between spacer sleeves as might impair their function in setting the saw guides in predetermined spaced relation.

Although several embodiments of this invention have been illustrated and described, various modifications and changes may be resorted to without departing from the spirit of the invention or the scope of the attached claims, and each of such modifications and changes is contemplated.

I claim:

1. A saw guide for rotary saw machines having at least one rotary saw blade keyed to a saw arbor for rotation therewith and axially movable thereon, the saw guide comprising: a pair of support arms having contact surfaces for engaging opposite sides of a rotary saw blade, respectively; means for supporting said support arms in substantially parallel relation on opposite sides of a rotary saw blade while allowing said support arms to move laterally; means for securing said support arms together with predetermined spacing in back of the trailing edge of the saw blade; spacer means disposed intermediate said support arms in front of the saw blade for establishing predetermined spacing, and means for selectively positioning the support arms either into contact with said spacer means to establish predetermined spacing between contact surfaces and pressure contact with the guided saw blade or spaced therefrom, allowing the support arms to move laterally apart and release the pressure on the saw blade confined between contact surfaces.

2. A saw guide for rotary saw machines having at least one rotary saw blade keyed to a saw arbor and axially movable thereon, the saw guide comprising: a pair of substantially parallel support arms, said support arms having contact surfaces for engaging opposite sides of a rotary saw blade, respectively, each support arm being mounted to a spacer sleeve of predetermined axial length, both ends of the sleeve being tapered to define a narrow ring of contact; means for securing the support arms together in back of the trailing edge of the saw blade; and means for selectively positioning the support arms in predetermined spaced relation in front of the leading edge of said saw to establish a pressure contact with the guided saw blade or allowing the support arms to move apart and release the pressure on the saw blade confined between contact surfaces.

3. The saw guide of claim 2, each support arm being mounted to a spacer sleeve of predetermined axial length, both ends of the sleeve providing a narrow contact ring of approximately one thirty-second inch width.

* * * * *

UNITED STATES PATENT OFFICE
CERTIFICATE OF CORRECTION

Patent No. 3,645,304　　　　　　　　Dated February 29, 1972

Inventor(s) Elbridge W. Thrasher

It is certified that error appears in the above-identified patent and that said Letters Patent are hereby corrected as shown below:

Column 1, line 28, between "with" and "machine", insert -- a -- ; line 28, "is", third occurrence, should read -- if -- . Column 2, line 30, "equal" should read -- equally -- line 31, "are" should read -- arc -- ; line 62, "machines" should read -- machine -- ; line 65, "comprises" should read -- comprise -- . Column 5, line 30, "a ring 90", should read -- a ring 60 -- ; line 39, between "sleeves" and "each", insert -- of -- . Column 6, lines 3 and 4, "the room used as the working area of the blade while the large are [sic] (Y) allows" is a repetition of the previous lines and should be canceled; line 17, "of is" should read -- is of -- ; line 19, "operation" should read -- operating -- ; line 24, "collection of an appreciable" should read -- collection of any appreciable -- .

Signed and sealed this 14th day of November 1972.

(SEAL)
Attest:

EDWARD M. FLETCHER, JR.　　　　　　ROBERT GOTTSCHALK
Attesting Officer　　　　　　　　　　Commissioner of Patents